Dec. 9, 1930.  F. F. CHANDLER  1,784,044
STEERING GEAR
Filed Oct. 2, 1929
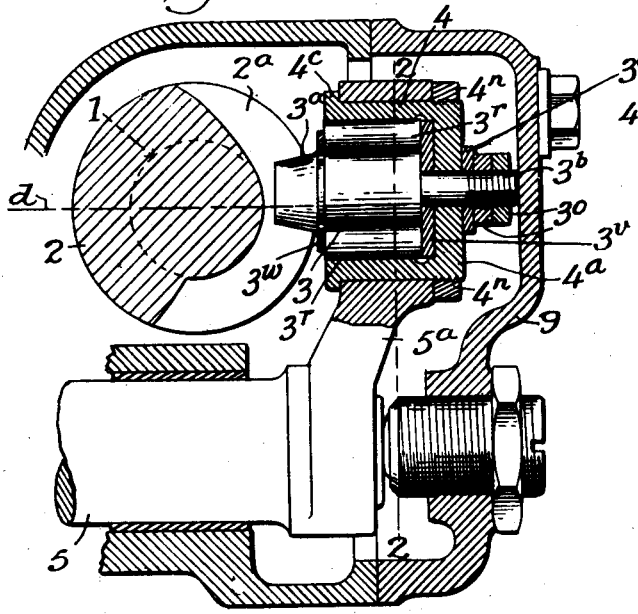
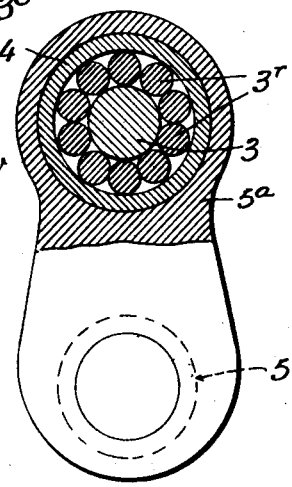
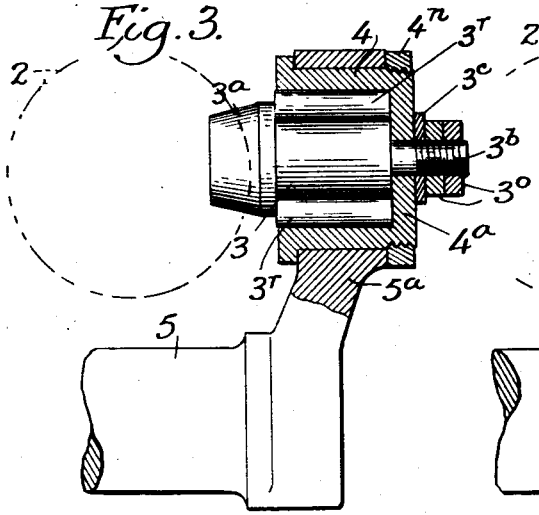
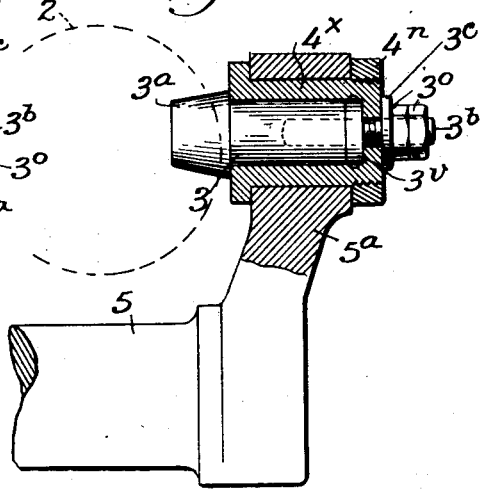
Inventor
Franklin F. Chandler
By Alexander T. Sewell
Attorneys Patented Dec. 9, 1930

1,784,044

UNITED STATES PATENT OFFICE

FRANKLIN F. CHANDLER, OF LA FAYETTE, INDIANA, ASSIGNOR TO ROSS GEAR & TOOL COMPANY, OF LA FAYETTE, INDIANA, A CORPORATION OF INDIANA

STEERING GEAR

Application filed October 2, 1929. Serial No. 396,833.

This invention is an improvement in "cam and lever" steering gears such as shown for example in Ross Patent No. 1,567,997, dated December 29, 1925, in which the rocker-arm is actuated by means of a cam on the steering shaft having a helical groove engaged with a pin on an arm of the rocker shaft.

In the present invention the pin is so constructed and mounted in the arm that axial movement of the pin will be prevented while it is free to rotate as hereinafter explained.

In the drawings I have illustrated some practical embodiments of the invention, and will explain the invention with reference to said drawings to enable others to readily adopt and use the same. In the appended claims the novel features and constructions of parts for which protection is desired are summarized.

In said drawings:

Fig. 1 is a view partly broken away and partly in section of part of a cam and lever steering gear equipped with my novel roller pin and pin mountings.

Fig. 2 is a detail section thereof on the line 2—2 Fig. 1.

Fig. 3 is a view illustrating a slight modification.

Fig. 4 is a similar view illustrating another modification.

The steering gear may be of any suitable construction, that shown being a Ross cam and lever gear in which the steering shaft 1 is connected to a cylindrical actuating member or cam 2 which is supported and confined in a casing 9 such as used in the said Ross gear.

The cam 2 has a spiral groove 2a in its periphery which is engaged with the head 3a of a pin 3 that is rotatably mounted in the arm 5a of the rocker shaft 5 journaled in bearings in the casing 9.

The opposite side walls of the helical groove 2a in cam 2 are slightly beveled outwardly, and the head 3a of the pin is tapered so that diametrically opposite sides of the head will fit against and closely engage the opposed walls of the cam groove.

As shown pin 3 is mounted in a sleeve or bushing 4 fitted in a bore in the rocker arm 5a opposite the cam 2. The bushing 4 is open at its end adjacent cam 2, but its other end is closed as at 4a. Bushing 4 extends through the opening or bore in the rocker arm and is secured against endwise movement therein. As shown the bushing projects through the arm and has an exterior flange 4c on its end adjacent the cam and is externally threaded on its rear end for engagement of a lock nut 4n which holds the bushing securely in the arm. The socket or recess in the bushing is cylindric for the reception of the shank of the pin.

The head 3a of the pin engages the groove 2a of the cam, and the pin has a reduced portion or shank 3b at its other end opposite the head which shank extends through an axial opening in the end wall 4a of the bushing. The shank of the pin may be formed integral with the pin—as indicated in Fig. 3, or formed separately from the pin and secured thereto in any suitable manner as indicated in Figure 4.

In order to prevent axial movement of the pin in the bushing 4, locking and jamb nuts 3° are screwed on the threaded end 3b of the shank exterior to the wall 4a of the bushing; and preferably an anti-friction washer 3c is interposed between the nuts 3° and the wall 4a of the bushing.

As shown in Fig. 1 anti-friction rollers 3r are interposed between the body of the pin and the inner wall of the bushing 4, and said pins are confined against longitudinal movement between the head 3a and the wall 4a. When the head is small a washer 3w, see Fig. 1, is interposed between the head 3a and the body of the pin, said washer partially projecting over the ends of the rollers to retain them in position. If desired a thrust washer 3v may be interposed between the inner end of the body of pin 3 and the wall 4a of the bushing, as in Figs. 1 and 4.

In the form shown in Fig. 3 the head 3a of the pin is of larger diameter than the body of the pin, and the washers 3w and 3v shown in Fig. 1, may be omitted.

In Fig. 4 the rollers 3r are omitted, and the pin body is rotatably fitted in the bushing 4x, which is of smaller diameter than the bushing 4 because of the omission of the rollers. The bushing 4x is secured in place by a lock nut 4n, and pin 3 is secured against axial endwise movement by lock nuts 3° on the threaded shank 3b of the pin. A thrust washer 3v is preferably inserted between the inner end of the pin body and the end wall of the bushing. The modifications shown are merely explanatory and not definitive or restrictive of the invention and as similar parts are similarly lettered in the drawings further detailed description of modifications is unnecessary.

The constructions shown in Figs. 1 and 3 are preferable to that shown in Fig. 4 because the pin can more readily revolve because of the anti-friction rollers. The means for resisting end thrust on the pin or axial movement of the pin in either right or left hand direction is substantially the same in all of the constructions.

The invention is not restricted to the specific type of gear illustrated, and may be adapted to other types of gears in which one member is operated by a pin engaging a spiral groove in another member.

As more fully explained in my application for roller pin (Case 7,658) filed September 30, 1929, Serial No. 396,227, when the axis of the pin is directly in the plane of the axis of the cam 2 the relative movement between the head of the pin and the walls of the groove will be uniform along the whole line of contact between the wall of the groove and the side of the pin head: but when the pin passes above or below the plane of the axis of the actuating member, the part of the wall of the groove at the outer end of the line of contact with the side of the pin head will move faster than the part of the wall of the groove at the inner end of such line of contact and would then exert a frictional wiping action upon the head of the pin, which wiping action will be enhanced by pressure on the pin head, and this wiping action tends to drag or move the pin axially, and if the pin could move axially such wiping action would cause the pin to bind in the groove and injure itself or the actuating member.

In my present invention the pin is prevented from being moved axially outward or away from the cam 2a by the engagement of the end of the pin body with the wall 4a of the bushing either directly or through the washer 3v, and inward axial movement of the pin is prevented by nuts 3° and washer 3c.

It will be seen that in each of the constructions shown the pin is free to revolve in the bushing but endwise or axial movement of the pin in either direction is resisted or prevented.

Therefore the pin can neither be drawn into the groove nor forced away from the groove by the wiping action of the walls of the groove on the head of the pin.

I claim:

1. In a steering gear, a cam and a rocker arm having an opening opposite the cam; a bushing mounted in said opening having a closed end wall; a pin rotatably mounted in said bushing and having a head engaging said cam groove and a shank projecting out of the bushing and means engaging the shank to confine the pin in the bushing; said pin being rotatable but not axially movable in the bushing.

2. In a steering gear, a cam and a rocker arm having an opening opposite the cam; a bushing mounted in said opening having a closed end wall; a pin rotatably mounted in said bushing and having a head engaging said cam groove and a shank, means engaging the shank to confine the pin in the bushing, and anti-friction members interposed between the body of the pin and the bushing to rotatably support the pin in the bushing.

3. In a steering gear, a cam and a rocker arm having an opening opposite the cam; a bushing mounted in said opening having a closed end wall; a pin rotatably mounted in said bushing and having a head engaging said cam groove and a shank extending through the end wall of the bushing; and means on the shank to confine the pin in the bushing; said pin being rotatable but not axially movable in the bushing.

4. In a steering gear, a cam and a rocker arm having an opening opposite the cam; a bushing mounted in said opening having a closed end wall; a pin rotatably mounted in said bushing and having a head engaging said cam groove and a shank extending through the end wall of the bushing; means on the shank to confine the pin in the bushing, and anti-friction members interposed between the body of the pin and the bushing to rotatably support the pin in the bushing.

5. In a gear, a spirally grooved cam and a rocker arm having an opening adjacent the cam; a bushing mounted in said opening having its end opposite the cam closed, a pin rotatably mounted in the bushing having a head engaging the groove in the cam and a reduced shank extending through the end wall of the bushing, means engaging the shank to confine the pin in the bushing and prevent axial movement of the pin, and anti-friction members interposed between the body of the pin and the inner wall of the bushing.

6. In a gear, a spirally grooved cam, and a rocker arm having an opening adjacent the cam; a bushing mounted in said opening and having its end opposite the cam closed, a pin rotatably mounted in the bushing having a head engaging the groove in the cam and a reduced shank extending through the end wall of the bushing; means on the shank to confine the pin in the bushing and prevent axial movement of the pin, a thrust washer interposed between the body of the pin and the end wall of the bushing, and anti-friction members interposed between the body of the pin and the bushing.

7. In a gear having a spirally grooved cam and a rocker arm having an opening adjacent the cam; a bushing mounted in said opening and having its end opposite the cam closed, a pin rotatably mounted in the bushing having a head engaging the groove in the cam and a reduced shank extending through the end wall of the bushing, means on the shank to confine the pin in the bushing and prevent axial movement of the pin, and anti-friction rollers interposed between the body of the pin and the bushing and confined against endwise movement between the head of the pin and the end wall of the bushing.

8. In a gear having a spirally grooved cam and a rocker arm having an opening adjacent to the cam; a bushing mounted in said opening having its end opposite the cam closed, a nut securing the bushing in position, a pin rotatably mounted in the bushing having a head engaging the groove in the cam and a reduced shank extending through the end wall of the bushing, a nut on the end of said shank confining the pin in the bushing and preventing axial movement thereof, a thrust washer interposed between the body of the pin and the end wall of the bushing; and a washer interposed between the nut on the shank and the end wall of the bushing.

9. In a gear, a spirally grooved cam and a rocker arm having an opening adjacent to the cam; a bushing mounted in said opening having its end opposite the cam closed, a pin rotatably mounted in the bushing having a head engaging the groove in the cam and a reduced shank extending through the end wall of the bushing; a nut on the end of said shank confining the pin in the bushing, a thrust washer interposed between the body of the pin and the end wall of the bushing; a washer interposed between the nut on the shank and the end wall of the bushing; and anti-friction rollers interposed between the body of the pin and the inner wall of the bushing and confined against endwise movement between the head of the pin and the end wall of the bushing.

FRANKLIN F. CHANDLER.